Nov. 23, 1965 R. A. MARVINNEY ETAL 3,218,849
MISSILE FLIGHT TEST APPARATUS
Filed Oct. 3, 1961 5 Sheets-Sheet 4

INVENTORS
RAYMOND A. MARVINNEY
JAMES P. MULDER
BY
Thomas W. Brennan
AGENT

Nov. 23, 1965  R. A. MARVINNEY ETAL  3,218,849
MISSILE FLIGHT TEST APPARATUS
Filed Oct. 3, 1961  5 Sheets-Sheet 5

INVENTORS
RAYMOND A. MARVINNEY
JAMES P. MULDER
BY
Thomas W. Brannan
AGENT

United States Patent Office 3,218,849
Patented Nov. 23, 1965

3,218,849
MISSILE FLIGHT TEST APPARATUS
Raymond A. Marvinney, Franklin Lakes, and James P. Mulder, Oakland, N.J., assignors to Thiokol Chemical Corporation, Bristol, Pa., a corporation of Delaware
Filed Oct. 3, 1961, Ser. No. 142,620
10 Claims. (Cl. 73—116)

This invention relates to missile testing apparatus and more particularly to missile testing apparatus wherein the free flight launching motions of the missile under normal flight conditions are observed and its launching characteristics determined.

Accordingly, it is an object of this invention to provide an apparatus of the type referred to in which the missile though constrained from actual free flight is nevertheless capable of moving under power generated by its own thrust producing means through specified distances in free flight.

A further object of this invention is to provide an apparatus of the type referred to in which the missile is suspended in a horizontal position from a substantially rigid frame by resilient means, so that upon initiating operation of the missile thrust producing means the free flight characteristics thereof over specified distances are readily observable and determined.

A still further object of this invention is to provide an apparatus of the type referred to in which the missile though constrained from free flight is nevertheless capable of being moved both horizontally and vertically through specified distances so as to demonstrate its free flight characteristics upon being jettisoned or otherwise released from an aircraft.

Still another object of this invention is to provide an apparatus of the type referred to in which additional means is provided to arrest the missile upon completion of its free flight over specified distances.

It is the practice at the present time in determining the free flight starting characteristics of a missile when launched from an aircraft to mount the missile on (or in) the aircraft, carry it aloft and launch it in the usual manner. The missile launching in the usual practice is then observed by a human observer or through the medium of motion pictures which are later viewed to determine the missile's behavior under launching conditions. However, such procedure is inherently expensive and usually involves the destruction of the missile undergoing the test unless elaborate recovery means is provided. In addition, the time consumed in preparation for the test, actual testing, recovery of the missile (if provided for) and assembling data becomes prohibitive.

The invention described herein overcomes these disadvantages by permitting the missile to be operated on the ground, closely observed, and more easily and inexpensively instrumented to obtain such technical data as may be considered necessary in accordance with the conditions of test. This is accomplished by providing a frame mounted on, or integrally part of, a support within which the missile is suspended or supported as by resilient elements, tie-rods, elastic cords, or extensible means attached to movable bushings mounted on guide rails or bars which are part of the frame. Also attached to the frame (or the support) at one of its ends and attached to the missile at its other end is an arresting means for halting the missile at the end of a prescribed or specified transitory motion. Therefore, by permitting the missile to move horizontally in one case, vertically in another arrangement to be described, the missile free flight starting characteristics are observed under conditions closely simulating actual flight. Upon completion of this particular phase of the missile's operation the arresting cylinder arrangement comes into play and the missile's motion ceases. The entire operational test is thus conducted with no harm to the missile.

Other features and objects of the invention will become apparent upon reference to the following description and accompanying drawings wherein two embodiments of the invention are disclosed for the purpose of illustration.

Figure 1:
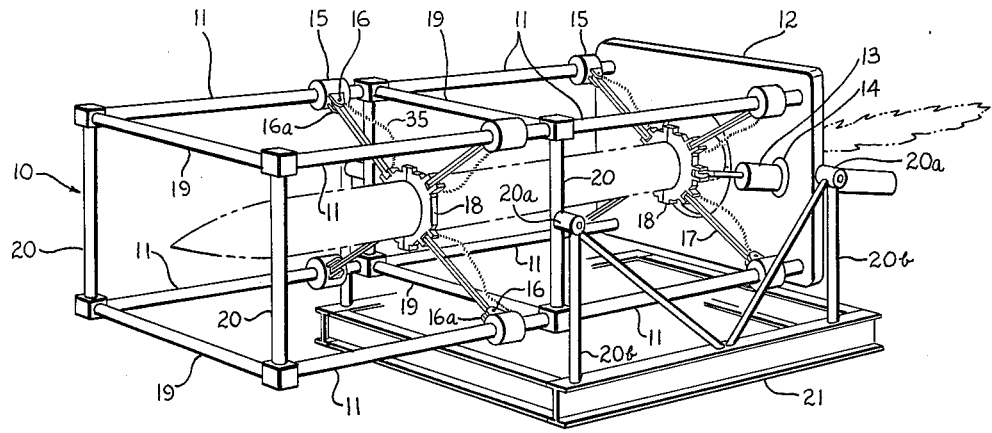
FIGURES 1 and 2 are illustrative of the invention showing the relative position of the parts thereof prior to and upon completion of the operation of a missile mounted thereon respectively.
Figure 2:
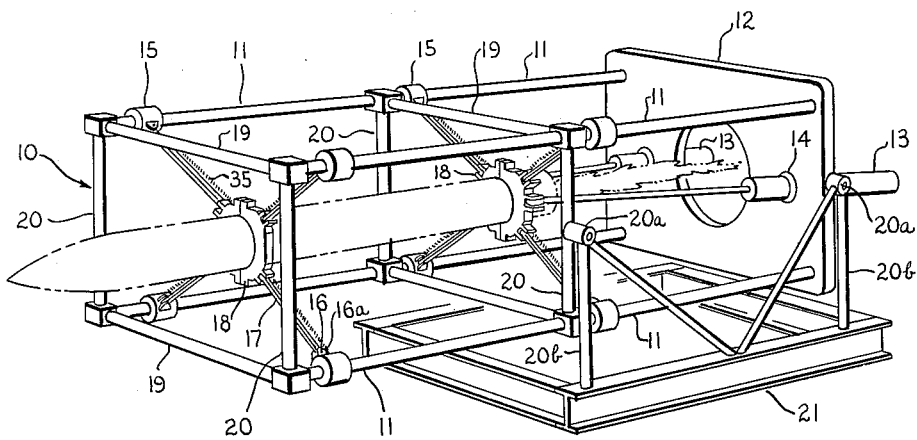

Referring to FIGURES 1 and 2 there is shown a frame 10 comprising a plurality of guide rails or bars 11, and a rearwardly positioned support plate 12 having a pair (FIGURE 2) of arresting cylinders 13 swivelled thereon by means of universal joints 14. Mounted on each of the guide bars 11 is a bushing 15 which contains suitable anti-friction bearings 15a (see FIGURE 5–a) for multi-directional movement on the guide bars 11 (arrows FIGURE 5). Attached to each bushing 15, by means of pin and gussets 16 and 16a (see also FIGURE 5) respectively is a resilient element or support shown in the form of elastic cords 17, and a radial motion limiting strap or cable 35. Elements 17 are preferably made of any elastic or resilient material and are attached at their other end to split-ring or collar 18 for supporting the forward end of a missile or may be one or more continuous cords with their ends held fast by U-bolt 17–a or similar fastener known in the art. Attachment of the elements 17 to the collar 18 is accomplished in a manner similar to that of the elements to the bushings. Rearward support and thrust load absorption is accomplished by the two-piece thrust yoke 28 which is equipped with devices which permit attachment to the missile by means of supporting provisions already existing in the missile as for example, pins or bolts 28–a. Other crosspieces and braces 19 and 20 complete the frame 10, which is mounted on the stand or support 21 and supported thereon by trunnions 20a and vertical risers 20b. Further means is provided on the yoke 28 for anchoring the piston rod 32 of arresting cylinder 13 comprising a bolt or pin 30 which passes through U-shaped appendage or extension 31 and piston rod end or tongue 34. Two-piece yoke 28 and split-ring or collar 18 are fastened together after installation on the missile by means of pairs of bolts 28b and 18a respectively (see FIGURE 5).

Figure 3:
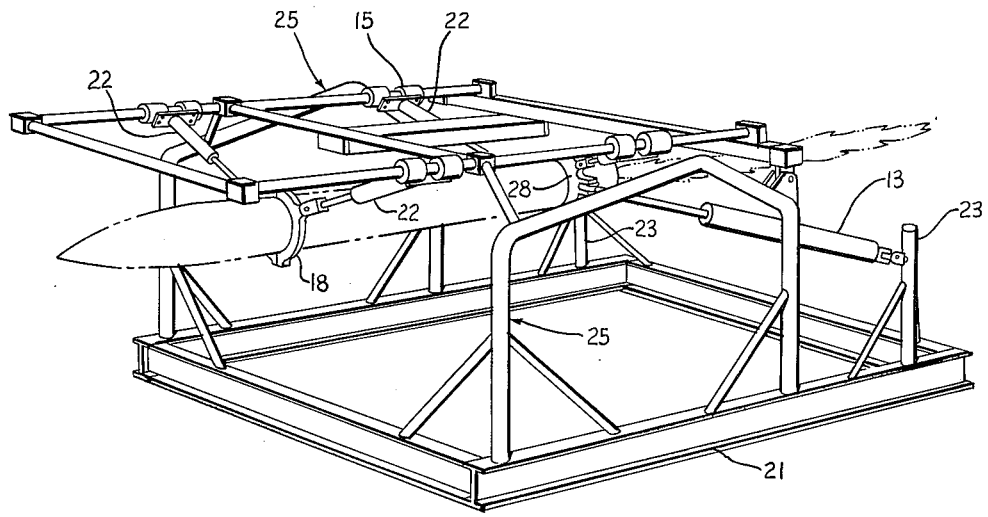
FIGURES 3 and 4 are illustrative of another form of the invention wherein a missile is shown just prior to operation and simulated dropping from an aircraft and at the completion of its motion in both horizontal and vertical directions respectively.
Figure 4:
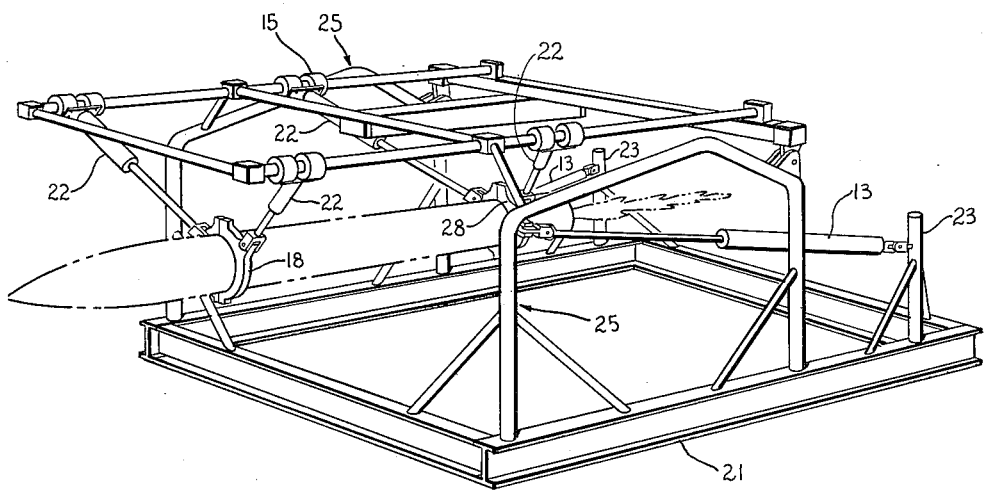

FIGURES 3 and 4 illustrate another form of the invention comprising a frame 25, and radial motion arresting cylinders 22 in lieu of resilient members 17 of FIGURES 1 and 2. Cylinders 22 are attached to the bushings 15 by means of bolts 26 or by welding and to the collar 18 and yoke 28 by bolting as shown (see FIGURE 6). In a manner similar to that shown in FIGURES 1 and 2 the missile being tested is supported by the split-ring or collar 18 forwardly and by the yoke 28 rearwardly which again receives the thrust load developed by the missile engine.

Arresting cylinders 13 are attached to the thrust yoke 28 at their one end in the same manner as previously described except that piston rod end 34 is a part of universal connection 33, and to staunchions or vertical posts 23 by means of universal connections 36 at their other end. Staunchions or posts 23 are rigidly mounted on the support or stand 21 as is frame 25.

Figure 7:
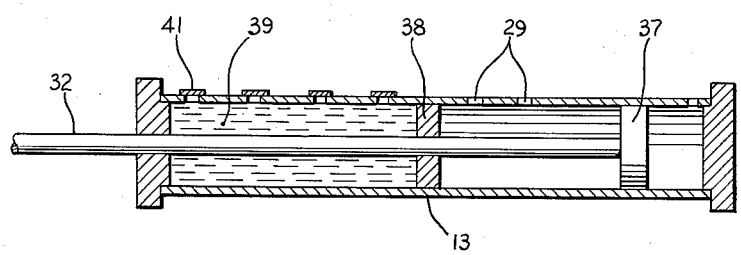
FIGURE 7 is a sectional view of a typical arresting cylinder which forms part of the invention.

In operating this invention as shown in FIGURES 1 and 2, a missile (shown in outline) is set in motion by the operation of its thrust producing rocket or jet engine. Because of the flexibility and high resilience of the members 17 the missile when suspended thereby is in a relatively unrestrained condition so that upon start-up of the missile's thrust producing engine its free flight (initial) characteristics over short but finite distances are readily observed. For safety in event of thrust engine malfunction, limit cables 35 are provided which prevent excessive missile travel in a radial direction. The missile's relatively unrestrained condition and the length of the traversed distance is dependent upon (1) the degree of resiliency of the elements 17 which is determined by their material, (2) their length and (3) the arresting cylinder 13 as will become apparent. Thus, the initial or launching period free flight characteristics of the missile during forward travel, while undergoing pitching, yawing and rolling actions are readily observable. At the end of the specified traversed distances the arresting cylinders 13 are provided to halt the missile and restrain it until engine operation is completed or otherwise ceases. The manner in which the horizontal distance traversed by the missile is determined by the arresting cylinder 13 will become more apparent by reference to FIGURE 7 and FIGURE 8–I–II and –III.

Figures 5, 5A:
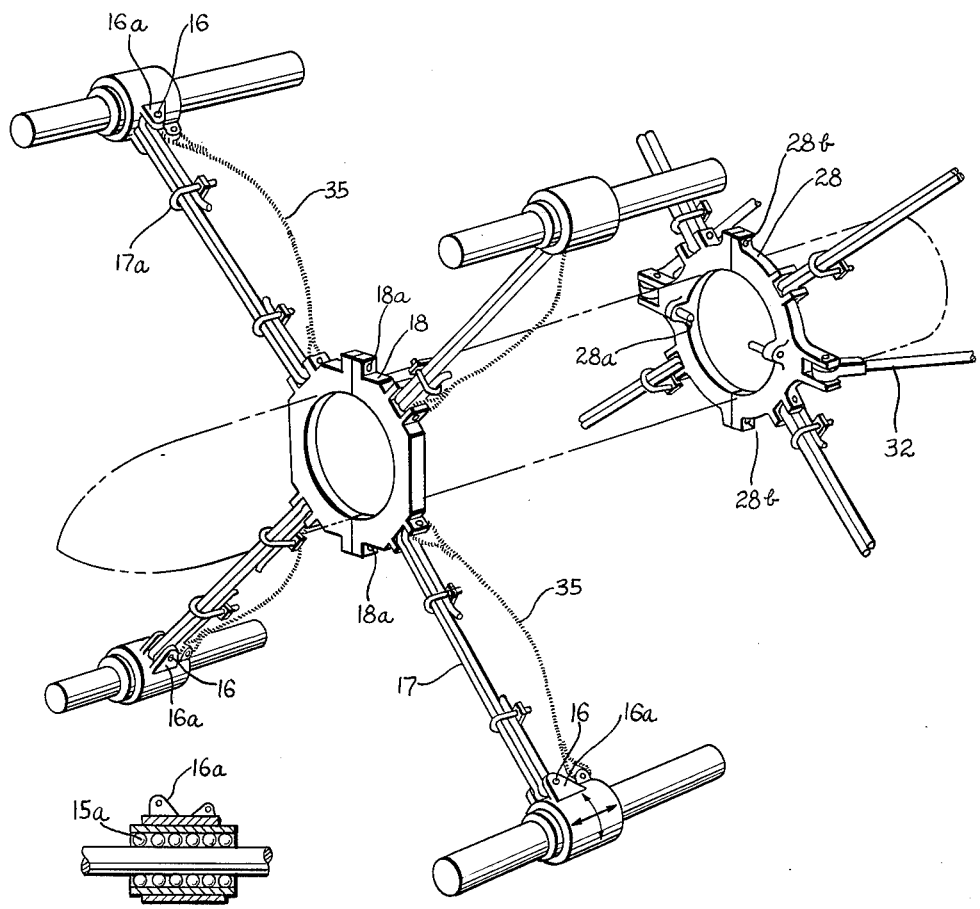
FIGURE 5 is an enlarged view ilustrative of pertinent details of the invention shown in FIGURES 1 and 2.
FIGURE 5a is a sectional view of the bushing shown in FIGURE 5.
Figure 6:
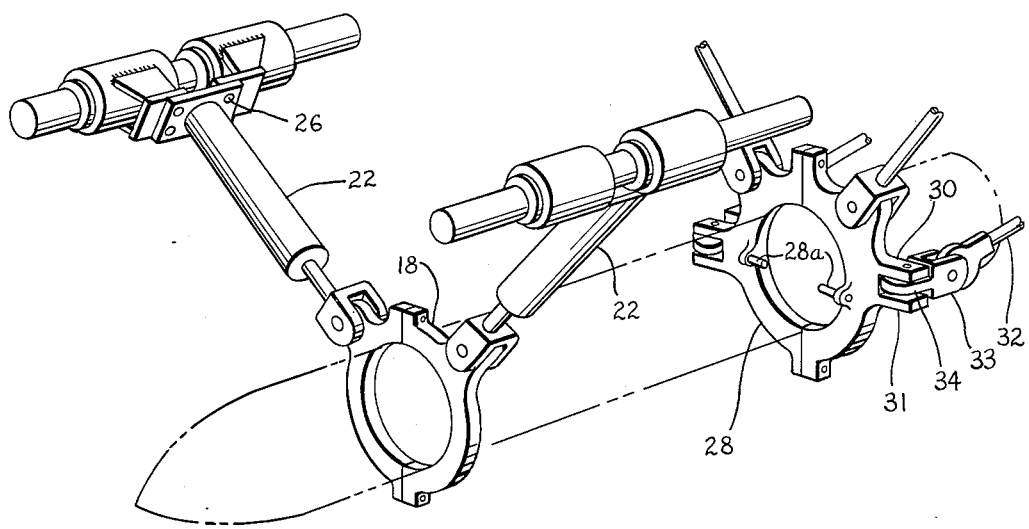
FIGURE 6 is an enlarged view illustrative of the pertinent details of FIGURE 5 as applied to FIGURES 3 and 4.
Figure 8:
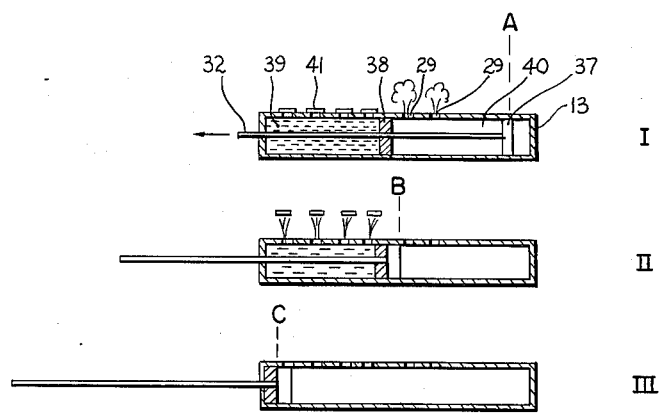
FIGURE 8 is a diagrammatic form of the arresting cylinder illustrating its mode of operation.

Upon missile start-up piston 37 in the arresting cylinder 13 is in the position A (FIGURE 8–I) and is fixedly attached to piston rod 32 which is attached to thrust yoke 28 (FIGURES 5 and 6). To the left of piston 37 is an air space 40 vented to the outside through vents 29 hence little or no resistance to free movement is offered to the piston 37 and attached rod 32 until Point B (FIGURE 8–II) is approached. The missile is then essentially free to traverse a distance closely equal to the distance from A to B and meets little or no axial resistance until piston 37 passes the last vent 29 and air pressure on the rod side of 37 rises. This is translated into a considerable axial arresting force on the missile and causes the free piston 38 to accelerate and pressure in the fluid such as water in space 39 to rise. Upon reaching a small positive pressure in the fluid in space 39 burst diaphragms or plugs 41 are dislodged and fluid flows out the unplugged ports. The appreciable axial arrestment forces thus built-up, cause the missile's axial motion to cease. Pistons 37 and 38 in their successive positions are shown in FIGURE 8 finally coming to rest at C, in FIGURE 8–III. As an additional measure of safety piston 38 is made of deformable, and/or resilient material whereby any unwanted residual forces generated by continuing engine operation, or premature arrival of the piston 37 at the end of the cylinder, are absorbed.

In the configuration shown in FIGURES 3 and 4 (and in part in FIGURE 6) the resilient members 17 of the earlier described form of the invention are replaced with radial motion arresting cylinders 22, which are constructed in the same manner as the axial arresting cylinder 13. Use of the cylinder 22 permits an additional free flight missile characteristic to be observed since the length of unrestricted travel of the piston 37 and corresponds to a free fall distance of the missile, thereby closely simulating a free fall launching of the missile from an airplane. By providing a pressurant such as an ignitable powder charge in front of the piston or an additional power cylinder (not shown), a forced or propelled missile launching or vertical descent simulation is achievable. By use of the invention in this form the thrust producing engine in the missile can be operated at any time prior, during or after vertical descent or movement thereby simulating all moves of missile launching in a simple, inexpensive and harmless (to the missile) manner not obtainable with prior art devices. By utilizing the usual bushing 15 and attaching thereto the cylinder 22 horizontal motions are also obtained as with the invention of FIGURES 1 and 2 earlier described.

Upon completion of the free flight demonstration test and engine operation, the parts comprising the invention are returned to their original positions (FIGURES 1 and 3) and fluid is replaced in the space 39 of all the arresting cylinders. The burst plugs are all replaced and the invention is in readiness for the next test.

As is also readily apparent from the drawings and foregoing description this invention is simple in construction and operation, fabricated of inexpensive materials and is of such a configuration as to possess a high degree of portability.

Having thus described the invention and its advantages over heretofore available devices and apparatuses it is to be understood that many variations thereof in constructional details and arrangements of parts are possible, as will become apparent to those skilled in the art to which it pertains. It is intended therefore that within the scope of the following claims the invention may be practiced other than as specifically described.

What is claimed is:

1. A device for holding a missile to determine the motions thereof in initial phases of free flight comprising a frame, a rearwardly positioned plate fixedly attached to the frame, a plurality of guide rods extensible from said rearwardly positioned plate, said guide rods each comprising at least one bushing movable thereon, at least one resilient element extensible from each of said bushings and movable therewith, said elements terminating at a point substantially interiorly of said frame, means attached to said resilient elements for holding the missile, and arresting means swivelled on said rearwardly positioned plate for restraining the missile upon completion of said free flight motions.

2. A device for holding a missile to determine the motions thereof in initial phases of free flight comprising a frame, a plurality of guide rods connected to the frame, at least one bushing mounted on each said guide rod and movable thereon, at least one expandable element attached to and movable with each bushing and terminating interiorly of said frame, means attached to said elements for holding the missile, and arresting means swivelled on said frame to restrain the missile upon completion of said free flight motions.

3. An apparatus for holding a thrust producing missile to determine the free flight launching motions thereof comprising a frame, missile supporting means attached to the frame for supporting the missile, means on said missile for attaching the support means, a plurality of bushings movable over portions of the frame and connected to said support means, and arresting means attached to the frame and to the missile operable to permit unrestrained initial stage free flight missile motion and thereafter to restrain said missile from further free flight.

4. An apparatus for holding a thrust producing missile to determine the free flight launching motions thereof comprising a frame, a rearwardly positioned plate fixedly attached to the frame, a plurality of guide bars extensible from said rearwardly positioned plate, at least one bushing mounted on each of said guide bars, said bushings comprising anti-friction bearings contacting said guide bars for facilitating movement of said bushings and movable therewith on said guide bars, at least one radially extending missile support means attached to each of said bushings therewith, a collar positioned forwardly on the missile and attached to said support means for partial support thereof, a thrust yoke for partially supporting said missile, and arresting means swivelled on said rearwardly positioned plate and attached to said thrust yoke on the missile for constrainment thereof upon completion of said free flight launching motions, said motions induced by said missile thrust producing means.

5. An apparatus for holding a missile containing a thrust producing means to determine the free flight launching motions thereof comprising a frame, a plurality of guide bars attached to the frame, at least one bushing mounted on the frame and movable thereon, at least one expansible support means mounted on each of said bushings at one end thereof and movable therewith, a collar attached to the opposite end of said missile support means for partially holding the missile positioned below the guide bars and forwardly on the missile, a thrust yoke for partially holding the missile and positioned rearwardly thereon, said missile support means capable of partially restraining the movement of said missile in a radial direction, and arresting means attached to said frame and to said thrust yoke for restraining the missile upon completion of said free flight launching motions induced by said missile thrust producing means 6. The apparatus of claim 3 in which each bushing comprises a plurality of anti-friction bearings contacting the portions of the frame for facilitating the movement of the bushings thereon.

7. The apparatus of claim 3 in which the arresting means is a cylinder comprising a first piston, a piston rod attached to said first piston and movable therewith in the cylinder, a second piston comprising means defining a passageway for passage of the piston rod therethrough, means defining a first fluid containing space between said first and second pistons, venting means in said first space between said first and second pistons, means defining a second fluid containing space between said second piston and the cylinder end, means in said cylinder end defining a passageway for passage therethrough by the piston rod to the exterior of the cylinder, and pressure relieving means in the fluid containing space for passage of said fluid to the exterior of said cylinder.

8. The apparatus of claim 3 in which the support means are resilient cords.

9. The apparatus of claim 3 in which the missile support attaching means comprises a forwardly positioned split-ring and a rearwardly positioned two-piece thrust yoke.

10. The apparatus of claim 2 in which the expandable element is a cylinder comprising a pair of interiorly positioned movable pistons, a piston rod attached to one of said pistons, said piston movable thereby, means defining a fluid containing space between the pistons, venting means in said space, means in the other of said pistons defining a passageway for passage therethrough by said piston rod, means defining a fluid containing space between said other piston and the cylinder end, means in said fluid containing space for pressure release of said fluid contained therein to the exterior of the cylinder, and means in said cylinder end defining a passageway for passage therethrough by said piston rod to the exterior of said cylinder.

References Cited by the Examiner

UNITED STATES PATENTS

| 2,524,413 | 10/1950 | Migula | 73—116 X |
| 2,810,288 | 10/1957 | Herron et al. | 73—12 |
| 3,014,360 | 12/1961 | Herrmann | 73—12 |
| 3,015,231 | 1/1962 | Ganahl | 73—116 |

FOREIGN PATENTS 749,445 11/1944 Germany.

RICHARD C. QUEISSER, *Primary Examiner.*

DAVID SCHONBERG, *Examiner.*